United States Patent [19]

Dobrzanski

[11] Patent Number: 4,672,217

[45] Date of Patent: Jun. 9, 1987

[54] EASILY CLEANED PHOTOELECTRIC SMOKE DETECTOR

[75] Inventor: John J. Dobrzanski, New Britain, Conn.

[73] Assignee: General Signal Corporation, Stamford, Conn.

[21] Appl. No.: 720,440

[22] Filed: Apr. 5, 1985

[51] Int. Cl.⁴ ...................... G01N 21/53; G08B 17/10

[52] U.S. Cl. ..................................... 250/574; 340/630

[58] Field of Search ................................ 250/573–575; 340/628–630; 356/338, 438, 439

[56] References Cited

U.S. PATENT DOCUMENTS

| | | | |
|---|---|---|---|
| 4,074,341 | 2/1978 | Niederost et al. | 340/629 |
| 4,206,366 | 6/1980 | Marsocci et al. | 250/574 |
| 4,236,822 | 12/1980 | Jaretsky et al. | 340/628 |
| 4,488,049 | 12/1984 | Marsocci | 250/574 |
| 4,539,556 | 9/1985 | Dederich et al. | 250/574 |

OTHER PUBLICATIONS

1984 Catalog G; Alarm Supply Co., Inc.

*Primary Examiner*—Edward P. Westin

*Attorney, Agent, or Firm*—Robert R. Hubbard; Milton E. Kleinman

[57] ABSTRACT

A photoelectric smoke detector which operates on the scattered light principle and involves a light source, and a photosensor placed at an angle to the light beam such that it is normally not illuminated, the light source and photosensor being located within a dark detection chamber having air entry ports that restrict ambient light; smoke particles entering the smoke chamber produce interruption of the light beam, thereby scattering light onto the photosensor. The detection chamber is formed within a cup-shaped grill which can be readily removed from the housing by rotation of the grill to disengage a locking mechanism; the grill is provided with an end wall and, integrally formed therewith, spaced inner and outer cylindrical side walls, the inner side wall being defined by baffles which include scoop fins that are used to trap light, but which also function to scoop air into the chamber and cause air turbulence for mixing the smoke particles thoroughly; the outer side wall having windows for entry of smoke. The smoke detector may be tested by inserting a special probe into a hole located at the center and top of the grill, the probe interrupting the light beam and causing reflection of light onto the photosensor.

10 Claims, 5 Drawing Figures

EASILY CLEANED PHOTOELECTRIC SMOKE DETECTOR

BACKGROUND OF THE INVENTION

1. Field of the Invention

This invention relates to a photoelectric smoke detector which operates on the scattered light principle. In accordance with this principle a light source and photosensor are provided within a detector chamber, the photosensor being placed at an angle to the light beam such that it is normally unilluminated by such beam, the detection chamber having air entry ports that restrict ambient light. Smoke particles entering the smoke chamber interrupt the light beam, thereby scattering light onto the photosensor.

2. Background Information

The present invention is related to an invention described and claimed in U.S. Pat. No. 4,654,644, assigned to the assignee of the present invention. That co-pending application claims circuitry involved with the smoke detector herein described. The details of the circuitry of the co-pending application are herein incorporated by reference.

Light scattering smoke detectors have been known before and in order to place the present invention in its proper context, reference may be made to the following U.S. Pat. Nos. 4,168,438; 4,206,366 and 4,216,377.

It will be apparent from a reading of these three patents that a paramount concern has been to prevent light reflection from the detection chamber walls from producing an undesirable inherent noise level, thus reducing the sensitivity and reliability of the detector. Likewise, it is of fundamental concern to prevent light from the ambient from entering the dark detection chamber.

Whatever the merits of the devices described in the above cited references, they do not fulfill the purposes and objectives in accordance with the present invention.

SUMMARY OF THE INVENTION

An object of the present invention is to achieve an extremely compact unit that will enable great ease in cleaning of the detector in the field; that is to say, cleaning by the customer wherever he may be located. Heretofore it has been the custom to return a smoke detector unit to the factory for appropriate cleaning. This is a time consuming and otherwise highly undesirable procedure, since it places an unnecessary burden on the manufacturer.

A further object of the present invention is to realize a unique construction for the detection chamber such that ready access may be gained into the interior of the chamber for cleaning purposes, and at the same time to expose the photo-optics in the form of a light source and a photosensor, so as to make them readily reachable for swab cleaning. A related object is to enable at the same time ready removal of a bug screen for cleaning purposes when the grill is disengaged from the housing of the detector.

Another object is to trap light within the detection chamber, and, by means of the same structure, to scoop air into the chamber and cause air turbulence for mixing the smoke particles thoroughly, thereby to ensure a homogenized sampling of air.

Yet another object is to enable simplified testing of the operation of the smoke detector within a calibrated smoke obscuration, and to accomplish the testing without involving complicated mechanical parts attached to the detector housing.

The smoke detector of the present invention comprises a housing, including a base and a cover member fitted to the base; a grill which is provided with an end wall and, integrally formed with said end wall, spaced inner and outer cylindrical side walls, the inner side wall being defined by a series of baffles; and a detection chamber formed by (1) the inner cylindrical side wall of the grill, and at opposite ends thereof, by (2) the end wall of said grill and by a portion of the cover member, respectively.

In accordance with a primary feature of the present invention, the uniquely constructed grill is provided with means for readily removably attaching it from the cover member of the housing. By this arrangement the customer may simply grasp the grill and by suitably twisting or turning it, separate it completely from the housing. As a consequence, the interior of the detection chamber becomes completely exposed for cleaning; concomitantly, a bug screen which is disposed between a spaced inner and outer cylindrical side walls of the grill may then be removed from the free end of the grill. As a further result, the light source and light sensing element are also completely exposed, precisely due to the novel construction, and become available for cleaning purposes, the light source and photosensor being disposed on a portion of the cover member which defines the other end of the detection chamber.

It will be appreciated that, since only the customer is made aware of the consequences of twisting or rotating the grill, and further that a special tool may optionally be employed, a tamper-resistant feature is provided. It is not readily apparent from the appearance of the grill that the grill can be easily removed from the housing.

A more specific feature of the present invention resides in the particular configuration for the inner side wall of the detector grill. This side wall is defined by a series of spaced baffles, including so-called "scoop fins" that are used to trap light but which also function to scoop air into the chamber. This feature will become self-evident as the description proceeds.

The testing feature previously alluded to involves testing of the smoke detector by inserting a special probe into a hole located at the center and top of the grill. The probe interrupts the light beam, thereby causing reflection of light onto the photosensor and thus simulating the presence of smoke within the detection chamber.

Other and further objects, advantages and features of the present invention will be understood by reference to the following specification in conjunction with the annexed drawing, wherein like parts have been given like numbers.

DESCRIPTION OF PREFERRED EMBODIMENT

Figures 1, 2:
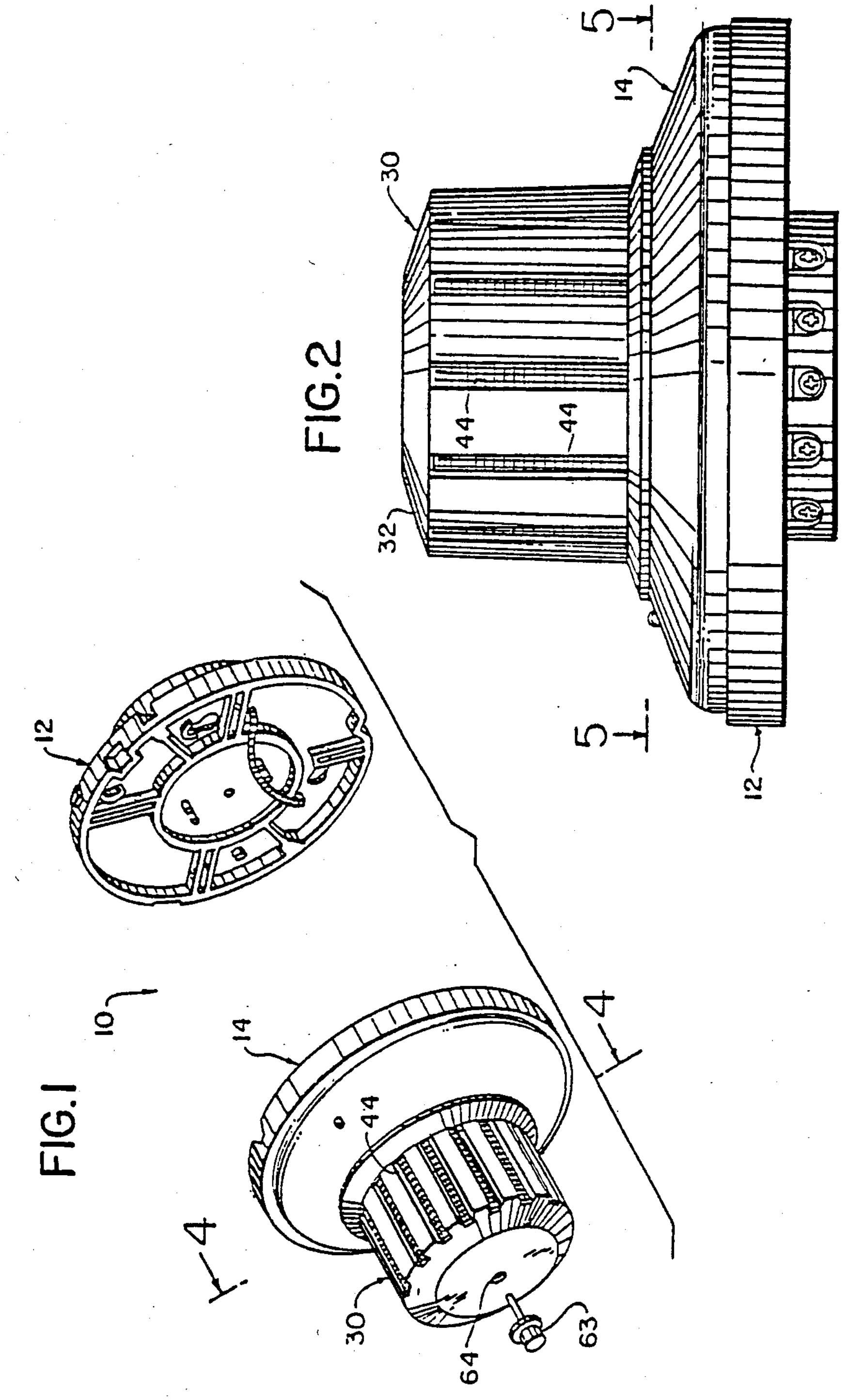
FIG. 1 is an exploded view of the main components of the smoke detector device in accordance with the present invention, including the probe that is used to interrupt the light beam for testing purposes.
FIG. 2 is an elevation view, of the smoke detector unit or device.

Referring now to the figures and in particular to FIG. 1, there will be seen a light scattering smoke detector device in accordance with the preferred embodiment, such device being designated 10 in the figures. The smoke detector 10 comprises a housing, including a base 12 and a cover member 14 which is adapted to fit with said base, the base serving for mounting the detector on a mounting surface such as a ceiling of a room. It will be understood that a number of suitably interconnected electrical components are contained within the cover member 14.

Figure 5:
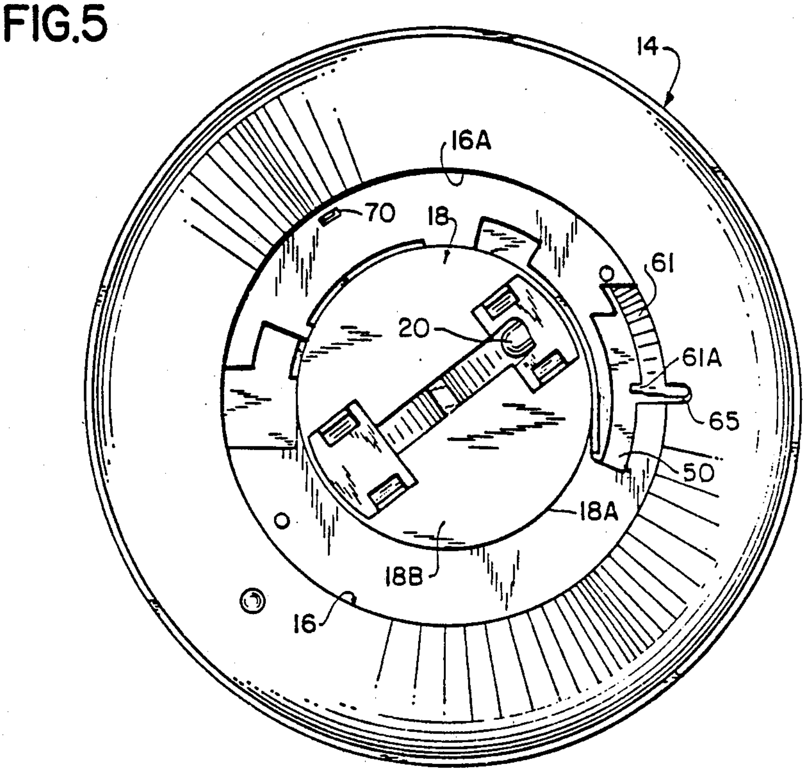
FIG. 5 is a top plan view, taken on the line 5—5 in FIG. 2, of the cover member combined with the base of the detector.

At one side of the cover member 14 (FIG. 5) there is provided a dish-shaped declivity or recess 16. Platform or raised member 18 is disposed in a central location within the recess 16. The photo-optics, in the form of a light source 20 and a photosensor 22, are located on a ramp 24 formed in the platform 18. As a result, light emitted from the light source 20, in the form of an LED or the like, does not directly impinge on the photosensor or light sensing element 22. Though not shown in the drawing, it will be apparent that the source 20 and the photosensor 22 are arranged to be connected to an appropriate power source and alarm circuit; for example, to that circuit disclosed in co-pending application Ser. No. 720441 filed Apr. 5, 1985 previously noted.

Figure 3:
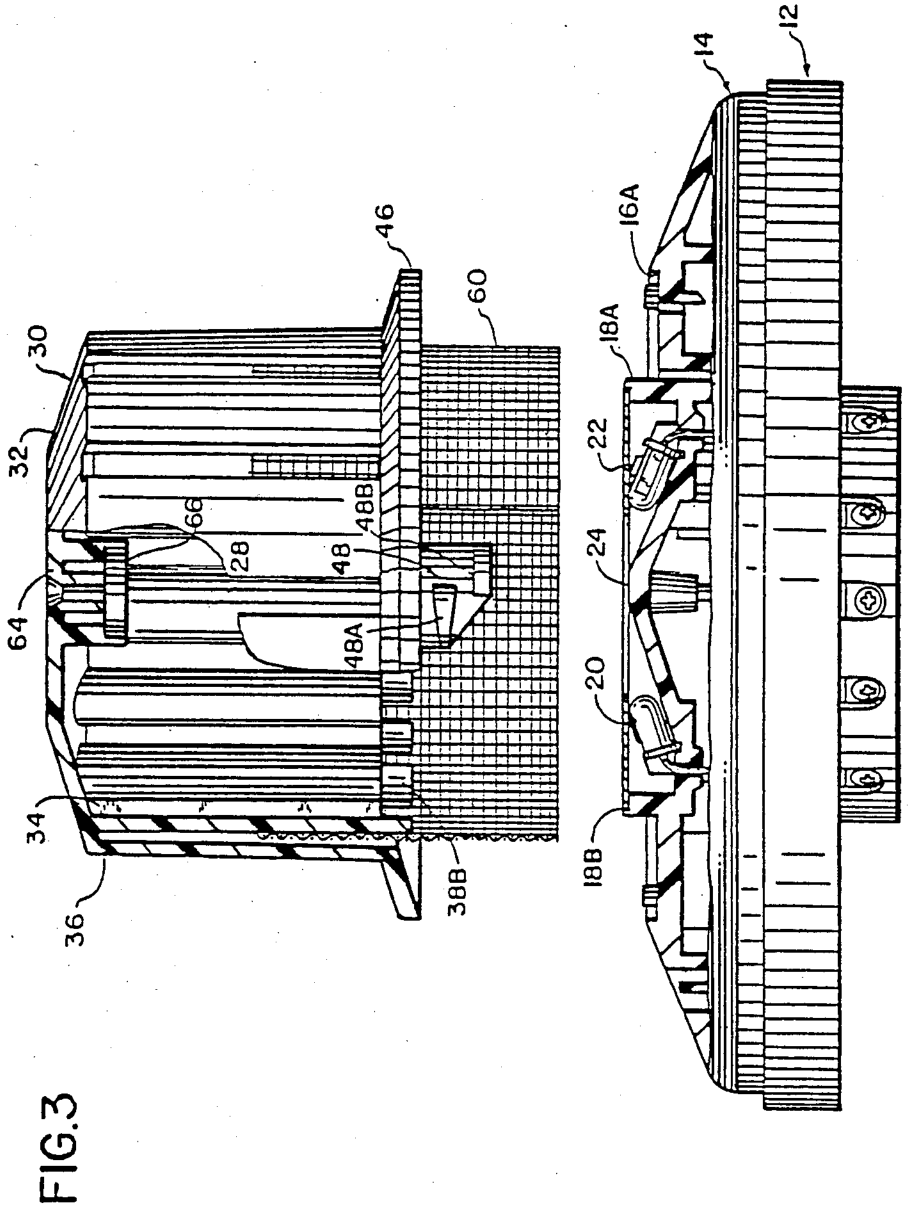
FIG. 3 is another exploded view, partly in cross-section, particularly illustrating the configuration of the inner side wall of the grill component of the smoke detector.
Figure 4:
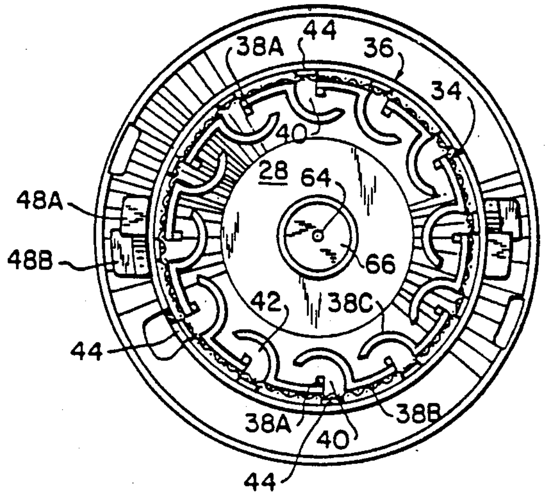
FIG. 4 is a bottom plan view, taken on the line 4—4 seen in FIG. 1, of the grill.

The primary feature of the present invention, which relates to the facility for cleaning the interior of the detector, particularly the detection chamber and the photo-optics arrangement, will now be highlighted. It will be seen that a grill 30 is provided having an end wall 32 of frusto-conical configuration. Integrally formed with this end wall are spaced inner and outer cylindrical side walls 34 and 36 respectively (FIG. 3). A detector chamber 28 is defined by the end wall 32, side wall 34, and the portion of cover member abutted by the side wall 34. The inner side wall 34 consists of, or is broken up into, a series of baffles, each baffle 38 being seen in FIG. 4 to have a radially extending straight portion 38A, a circumferentially extending, substantially straight portion 38B and an arcuate portion 38C. Each of these arcuate portions constitutes a "scoop fin" for permitting ready flow of air into the detection chamber 28. This same construction, that is, of the scoop fin 38C, traps light within the chamber and also prevents external light from penetrating into the chamber 28.

It will be noted (FIG. 3) that the straight portions 38B extend downwardly further than the portions 38A and 38C of the baffles; and that they are adapted to surround the peripheral surface 18A of platform 18. On the other hand, portions 38C directly abut the top surface 18B. Accordingly, a tight, light-precluding fit is assured. Also, the grill 30 is so dimensioned that its flange 46 fits tightly against the peripheral surface 16A of recess 16. Accordingly, it is assured that no ambient light can enter from this source.

It will be seen that the scoop fin or portion 38C on a given baffle 38 overlaps an adjacent baffle. That is to say, the portion 38C extends inwardly and overlaps a radially extending portion 38A and part of a circumferentially extending portion 38B of its nearest neighbor. Accordingly, a port 40 for the entry of air is defined by the coaction of the portion 38C of a given baffle with the radially extending portion 38A of the adjoining baffle. It is further noted that a complete passageway 42 is defined by the cooperation between the portions 38A and 38C of two adjacent baffles 38.

The outer cylindrical side wall 36 of grill 30 contains a series of spaced, axially extending windows 44. This discrete arrangement of a series of windows or openings 44 is regarded as superior to a continuous opening at the periphery of the grill 30. In the particular example illustrated, these individual windows 44 are seen as being aligned with respective ports 40 previously described as being formed between adjoining baffles of the wall 34. However, it has been found that in certain situations, it may be preferable to offset the windows 44 about 15° from the ports 40. This is particularly so where high intensity light flashes (e.g. due to flash bulb) are present in the ambient.

As has been noted previously, the detection chamber 28 is formed by the inner cylindrical side wall 34 and, at ends thereof, by the end wall 32 of the grill and by a portion of the cover member 14. In the particular preferred embodiment, that portion consists of the platform 18, against whose upper surface the lower ends of scoops 38C abut.

Affixed to the flange 46 at its lower surfaces is a pair of locking members 48, which are adapted to be received in diametrically opposed, respective receptacles 50 formed in the recess 16. Spaced upper and lower lugs 48A and 48B are provided on each of the locking members. The upper lugs 48A firmly engage the underside of the wall 62 of recess 16 when the grill is rotated in the clockwise direction. Concomitantly, the associated lower lug 48B extends below a projection 61A on optionally provided flexible member 61. The result is that such projection 61A becomes positioned behind upper lug 48A. The grill can be released only by a special tool optionally used to depress member 61 through slot 65. The customer is apprised of the locking mechanism 48 such that, assuming member 61 is not optionally provided, all that is required for cleaning purposes is for the customer to grasp, with one hand, the outer periphery of the grill 30 and to turn in the opposite direction to remove the grill 30 from the housing, that is, from the side of the cover to which it is removably attached by the locking member 48.

It is this simple operation by the customer of appropriately twisting or rotating the grill that facilitates complete cleaning of the critical parts of the detector. Accordingly, it is not necessary to dismantle a number of different parts to get at the photo-optics of the detector. As will be appreciated, since both the inner wall, consisting of the baffles 38, and the outer wall containing the windows 44 are integrated or united in the grill 30, when this element is removed, nothing further need be done to get at the interior of the detection chamber 28.

It will be noted that the bug screen 60 is situated or disposed between the outer and inner walls 36 and 38 respectively of the grill 30. Therefore, when the grill 30 is removed from its normal abuttng relationship with the cover 14, the bug screen 60 can be shaken loose, that is, since the end of the grill is then free the bug screen may be readily removed for cleaning.

A switch-activating member 70 (FIG. 5) is provided for actuating a switch, not seen here but disclosed in co-pending application (ED-232), for the purpose of initiating a trouble signal when the grill 30 is removed from recess 16. The member 70 extends through a suitable opening in wall 62 to the interior of cover member 14.

There will be seen in FIG. 1 a simple probe 63 that is adapted to be inserted into the hole 64 at the top of the center of the grill 30. When this probe is pushed in sufficiently, it will open up a resilient normally closed curtain 66. This will cause interruption of the light beam from source 20, causing light to be reflected onto the photosensor 22, thereby placing the system in an alarm state. Thus, the system can be effectively tested by simulation in the manner of a smoke condition.

While there has been shown and described what is considered at present to be the preferred embodiment of the present invention, it will be appreciated by those skilled in the art that modification of such embodiment may be made. It is therefore desired that the invention not be limited to this embodiment, and it is intended to cover in the appended claims all such modifications as fall within the true spirit and scope of the invention.

I claim:

1. A smoke detector comprising:

a housing, including a base and a cover member fitted to said base;

a grill, including means for removably attaching said grill to the cover member of said housing such that the detection chamber hereinafter recited is exposed for cleaning;

said grill being provided with an end wall and, integrally formed with said end wall, spaced inner and outer cylindrical side walls, said outer side wall having spaced windows;

a detection chamber formed by the inner cylindrical side wall of said grill, and, at opposite ends of said chamber, by the end wall of said grill and by a portion of said cover member, respectively;

a light source and a light sensing element within said detection chamber, said light source and light sensing element being located on said portion of said cover member and arranged such that the light source does not radiate onto the light sensing element.

2. A smoke detector as defined in claim 1, in which the inner side wall is defined by a series of evenly spaced baffles, each of said baffles including a scoop fin for permitting ready entry of air into said detection chamber but for trapping light, said scoop fin being constituted by an arcuate portion at one end of said baffles.

3. A smoke detector as defined in claim 2, in which each of said baffles further includes a radially extending straight portion at its other end, and connected thereto, a circumferentially extending, substantially straight portion.

4. A smoke detector as defined in claim 3, in which the arcuate portion on each baffle overlaps the circumferentially extending portion on an adjoining baffle.

5. A smoke detector as defined in claim 4, in which an individual smoke port is defined by said arcuate portion on a given baffle and by the radially extending straight portion on an adjoining baffle.

6. A smoke detector as defined in claim 1, in which a screen is disposed between said inner and outer side walls of said grill, said screen being removable from the free end of said grill when the grill is disengaged from said housing.

7. A smoke detector as defined in claim 1, further including a platform having a peripheral surface, and in which, when attached, the inner cylindrical side wall of said grill abuts said peripheral surface.

8. A smoke detector as defined in claim 7, in which one side of said cover member includes a recess, said platform being at the center of said recess, the light source and light-sensing element being disposed on a ramp formed in said platform.

9. A smoke detector as defined in claim 8, further including a locking member on said grill, and in which said means for removably attaching said grill to said cover member includes a receptacle provided in said recess to receive said locking member so that when said grill is suitably rotated, it will be locked into position against said cover member.

10. A smoke detector as defined in claim 9, in which said grill includes a flange adapted to abut against a surface of said recess.

* * * * *